United States Patent [19]

Laws

[11] 4,114,278
[45] Sep. 19, 1978

[54] TRACER APPARATUS

[75] Inventor: Arthur Ernest Laws, St. Albans, England

[73] Assignee: Trubenised (Sales) Limited, England

[21] Appl. No.: 767,210

[22] Filed: Feb. 9, 1977

[51] Int. Cl.$^2$ .......................... B23Q 35/28; H02P 7/38
[52] U.S. Cl. .................................. 33/23 K; 90/62 R; 318/578
[58] Field of Search ................ 33/18 R, 23 K, 23 H, 33/27 K; 90/62 R; 318/568, 578

[56] References Cited

U.S. PATENT DOCUMENTS

| | | | |
|---|---|---|---|
| 2,978,939 | 4/1961 | Von Zelewsky | 90/62 R |
| 3,122,970 | 3/1964 | Rhoades | 33/23 K |
| 3,481,577 | 12/1969 | Fling | 318/578 |
| 3,492,728 | 2/1970 | Morse | 33/18 R |

Primary Examiner—Richard E. Aegerter
Assistant Examiner—John W. Shepperd
Attorney, Agent, or Firm—Lawrence E. Laubscher

[57] ABSTRACT

A tracer apparatus is disclosed which includes a template mounted on a table and arranged to be moved along two orthogonal axes, and a stylus arrangement provided with a stylus which is arranged to follow the periphery of the template as the template moves, thereby to control the movement of the table so that the stylus maintains contact with the periphery of the template. The stylus is movably mounted so as to be moved both by virtue of its abutment against the periphery of the template and by electromagnetic devices. A sensing device is provided to sense displacement of the stylus from an initial position and to control operation of the electromagnetic devices, whereby the stylus moves arcuately when displaced and then rotated until it comes into contact once more with the periphery of the template. In the preferred embodiment, the electromagnetic devices co-operate with a permanent magnet to hold the stylus under a condition of unstable equilibrium against the periphery of the template.

6 Claims, 6 Drawing Figures

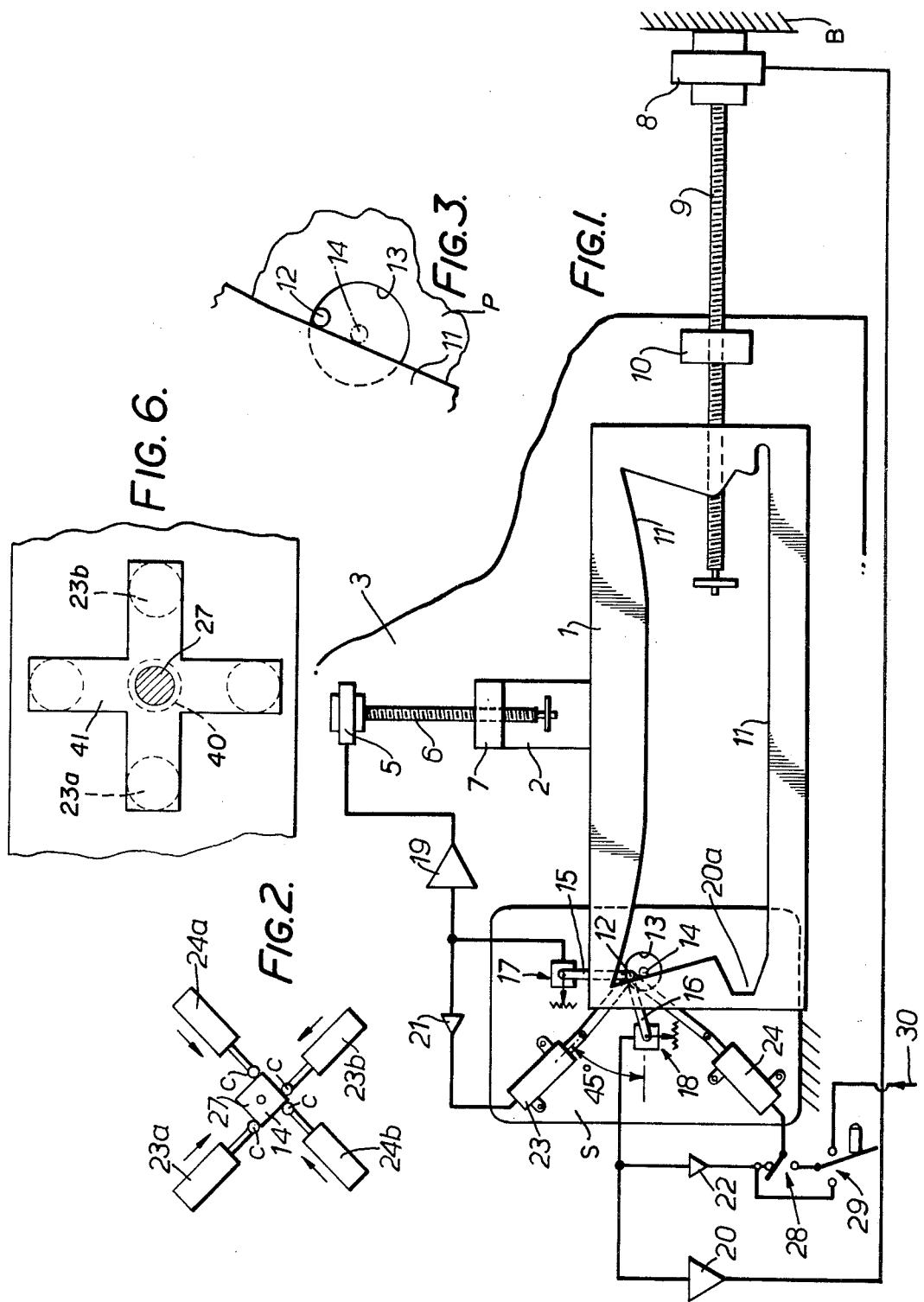

TRACER APPARATUS

BRIEF DESCRIPTION OF THE PRIOR ART

The present invention relates to tracer apparatus comprising means for mounting a template, means for following a periphery of the template, and means for causing relative movement between the template and the periphery following means.

A known form of tracer apparatus is used in apparatus for automatically producing a line of stitching of predetermined form which has a stationary sewing head and work-holding carriage mounted for movement in any direction in the plane of the work, movement of the carriage being effected by power-operated means under the control of a template of magnetic material whose shape corresponds to that of the required line of stitching and a driven roller which rolls on the periphery of the template and is held in engagement with it by magnetic attraction. Such apparatus, which is more fully described in the specification of the prior British Pat. No. 1108141 operates satisfactorily, but the preparation of the requisite magnetic templates is a skilled operation; it would clearly be advantageous if the follower element could be held in engagement with the template by means other than magnetic attraction between them, thus allowing the template to be made of sheet material (for example thin plastics sheet) which can easily be cut to the required shape by a knife or scissors.

SUMMARY OF THE INVENTION

A preferred form of the present invention provides tracer apparatus in which a stylus is maintained in substantially continuous contact with the (internal or external) periphery of a template during relative movement between those parts by means of biassing forces applied to the stylus through a mechanical connection thereto.

BRIEF DESCRIPTION OF THE DRAWING

The nature of the invention will otherwise sufficiently appear from the following description, given with reference to the accompanying drawing, of one particular form of tracer apparatus in accordance with the invention and some of the many possible modifications thereof. In the drawing:

FIG. 1 is a diagrammatic plan view and circuit diagram of the apparatus;

FIG. 2 is a fragmentary view showing a modification;

FIG. 3 is a diagram showing the forces acting on the stylus;

FIG. 6 is a sectional view taken along line 6—6 of FIG. 4.

DETAILED DESCRIPTION

Figure 4:
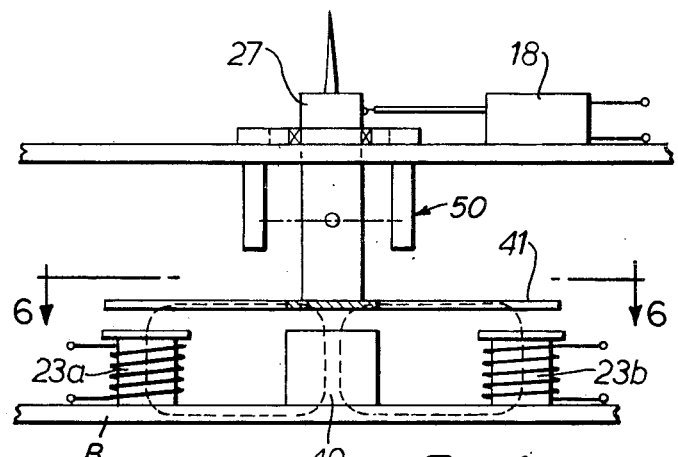
FIG. 4 is a diagrammatic side view of a stylus arrangement.

In the apparatus shown in the drawings, a template 1 of any suitable sheet material is disposed horizontally and mounted for movement in any direction in its own plane. For convenience of description, directions will be referred to the points of the compass, it being assumed that north is at the top of the drawing. The template 1 is removably attached to a slide 2 which can move north and south upon a carriage 3 and can be displaced in either direction relative to the carriage by actuation of a reversible electric motor 5 which is mounted on the carriage and operates to rotate a lead screw 6 making a threaded engagement with a nut 7 fixed to the slide 2. The carriage 3 can move east and west upon the fixed base of the apparatus (not shown) and can be displaced in either direction by actuation of a second reversible electric motor 8 which is mounted on the base B and operates to rotate a lead screw 9 making threaded engagement with a nut 10 fixed to the carriage 3.

The template 1 is formed with an opening whose periphery 11 corresponds in size and shape to the form of the required line of stitching. A stylus 12 supported from the fixed base of the apparatus extends through the opening 11 and is normally positioned vertically, but can rock angularly to a limited extent, the extent of the permitted movement of the stylus in the plane of the template being indicated in FIG. 1 by the circle 13 surrounding the normal position 14 of the stylus. The stylus 12 is connected by a link 15 to the movable contact of a potentiometer device 17 which controls through an amplifier 19 the direction and value of the energizing current fed to motor 5. The arrangement is such that whenever stylus 12 is displaced to the north of its normal position motor 5 is energized to drive slide 2 to the south and vice versa. Similarly, stylus 12 is connected by a link 16 to a potentiometer 18, which through an amplifier 20 controls the current fed to motor 8 in such a way that any westward displacement of the stylus will energize motor 8 to drive carriage 3 to the east and vice versa. Thus displacement of the stylus 12 in any direction from its normal position 14 will cause such energization of one or both of the motors as will result in the template 1 being driven in the opposite direction at a speed proportional to the extent of the displacement of the stylus.

In addition to controlling the energization of motor 5, the north-south potentiometer 17 controls through an amplifier 21 the supply of current to a solenoid device 23 which operates when energized to apply to the stylus a force inclined to the north south axis (conveniently at an angle of 45° as shown), so that northward deflection of the stylus results in the stylus being urged to the north west, while upon southward deflection it is urged to the southeast. Similarly, potentiometer 18 controls through an amplifier 22 a solenoid device 24 which upon eastward deflection of the stylus urges the latter to the north east and in response to westward deflection urges it to the south-west. For simplicity of illustration FIG. 1 shows each of the solenoid devices 23, 24 as consisting of a single solenoid whose armature is coupled by a link 25 or 26 to the spindle 12. A preferably arrangement is shown in FIG. 2, each solenoid device comprising a pair of solenoids 23a, 23b and 24a 24b, the two solenoids of each pair being disposed on diametrically opposite side of the normal position 14 of the stylus and being operated in class A push-pull. The armature of each solenoid carries a roller c which bears on one of the four faces of a square section block 27 carried by the stylus.

It will be appreciated that as a result of the action of the solenoid devices the system is in unstable equilibrium when the stylus is in its normal position and (as a consequence) neither of the motors 5 and 8 is energized. Any slight displacement of the stylus from its normal position will result in the application to it by one or both solenoid devices of forces whose direction is inclined at 45° to the direction of original displacement and which tend to increase the extent of displacement. Unless arrested, the stylus will move outwardly from the normal position 14 along a spiral path until it reaches the limit of its permitted movement indicated by the circle 13, and will then revolve in an anticlockwise direction around the circumference of this circle. When this movement of the stylus is arrested by the stylus encountering the internal periphery 11 of the template 1, one or both of the motors 5 and 8 is energized to drive the template in a direction parallel to the line joining the momentary position of the stylus to its normal position 14. This movement of the template displaces the stylus around circle 13 until a position such as that illustrated in FIG. 3 is reached, in which the edge of the template lies parallel to the line joining the momentary position of the stylus to its normal position; thereafter the template moves parallel to that part of its periphery with which the stylus is engaged. Any gradual change in the direction of the edge 11 of the template causes a corresponding change in the direction of movement of the template, the stylus remaining in contact with the template. Abrupt changes in the direction of the template edge (i.e. sharp corners in the pattern to be followed) may cause momentary loss of contact between stylus and template, but the stylus then resumes its revolutonary movement (as described above) and quickly reestablishes contact with the template on the further side of the corner, so the template then moves parallel to the new direction of its edge. Accordingly, the template moves along a path which corresponds in shape and size to that of the aperture bounded by the edge 11.

In the starting position of the template, the stylus is at 20a, at the south-west corner of the template When the template again reaches this position, having made a complete circuit around the stylus, it operates a switch 28, thereby disconnecting solenoid device 24 from amplifier 22 and connecting it through a switch 29 to a source 30 of a "wait" signal which causes solenoid device 24 to urge the stylus continuously to the southwest, i.e. in to the corner of the template. The motors 5 and 8 then adjust the position of the template until the stylus is in its normal position (at the centre of its circle of permitted movements) and thereafter maintain the template stationary in this position. To restart the operation and cause the template to make another circuit, switch 29 is operated manually, thereby disconnecting solenoid device 24 from source 30 and reconnecting it to amplifier 22. The operation then proceeds in the manner already described and when the template has moved a short distance from the starting position, switch 28 returns to the normal setting illustrated, the return of switch 29 to the normal position illustrated being then without effect.

It will be appreciated from the foregoing description that during almost the whole period of operation the stylus is at its maximum permitted distance from its normal position, so that the effective speed of movement of the template (which is proportional to the stylus displacement) is determined by the radius of the circle 13. This circle may be defined by an opening in a plate P (FIG. 3) arranged in parallel spaced relation between the fixed solenoid support means S (FIG. 1) and the template 11, said plate having a circular aperture through which the stylus extends, the permitted movement of the stylus being equal to the difference between the radii of the aperture and of the cross section of the stylus. To allow the speed of movement of the template to be varied easily, the portion of the stylus which extends through the aperture in the plate may be given a conically tapering form, and the plate arranged for adjustment axially of the stylus. Such adjustment of the plate may be under manual control and/or it may be affected automatically in response to movement of the template. For example, a cam or equivalent means carried by the template may so adjust the position of the plate that while the stylus is travelling along relatively straight portions of the template profile the speed of movement is high, and that the speed is reduced while the stylus is negotiating sharply curved portions of the profile.

If the tracer apparatus described is to be used for controlling an automatic sewing machine, a holder for the work to be stitched may be rigidly connected to the template so as to partake of its movement, the work being moved past a stationary sewing head, which accordingly forms a line of stitching corresponding in size and shape to the form of the template. Alternatively, the work-holder may be connected to the template through gearing of any suitable character such that its movement is increased, or reduced or otherwise varied, from that of the template. The tracer apparatus may, however, be used for controlling many operations other than sewing, appropriate tools being substituted for the sewing head. In suitable cases, the template may be connected directly or through gearing, to the tool so as to move it relative to a stationary work-piece.

The particular form of tracer apparatus described is clearly capable of many modifications, of which the following are examples only. Instead of disposing the lines of action of the solenoid system 23, 24 obliquely (as shown at angle of 45°) to the lines of action of the carriage drive systems, the lines of action of the two systems may coincide, it being then arranged (for example) that a northward displacement of the stylus which will energize the north-south motor system to move the template to the south, will cause energization of both the north-south and the east-west solenoid systems, so as to produce a biassing force on the stylus urging it to the north-west, as before. While only electrical control and operating means have been described, hydraulic pneumatic or other means can be substituted, either in whole or in part.

Figure 5:
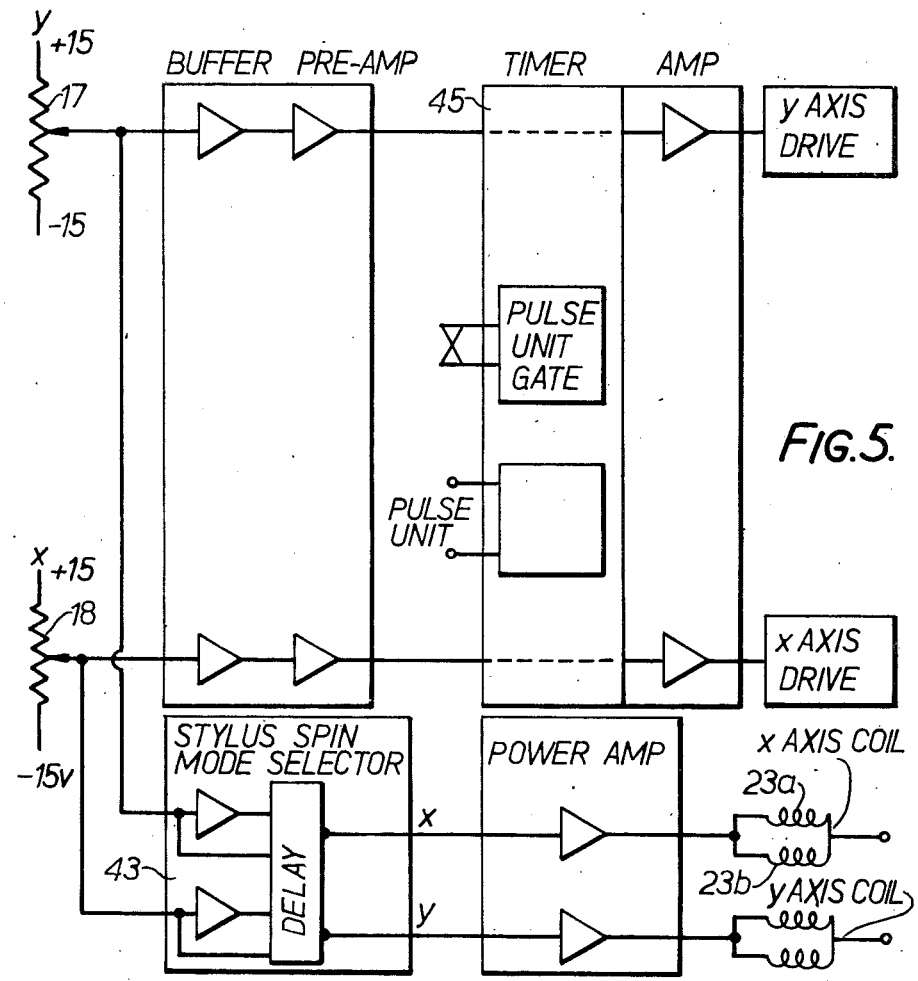
FIG. 5 is a circuit diagram showing a circuit for use with the stylus arrangement of FIG. 4.

An embodiment of a stylus arrangement in which the lines of action of the solenoid systems coincide with the lines of action of the drive systems is shown in FIG. 5 with reference to am improved stylus arrangement shown in FIG. 4, although by rotating the previous stylus arrangement through 45° the same effect could be achieved.

Referring firstly to FIG. 4, like reference numerals are used for like parts. Instead of mechanically moving the stylus block 27, the solenoid devices 23a, 23b and corresponding y-axis solenoid devices (not shown) cooperate with a permanent magnet 40 to establish an electro-magnetic field for moving the stylus block 27 in which the stylus 12 is fixed. The permanent magnet 40 ensures that the stylus is in unstable equilibrium when in the position shown. The movement is achieved by mounting the solenoids, as shown, at the four points of the compasss in alignment with the carriage drive systems and fixing a cruciform-shaped plate 41 of magnetic material to the block 27.

The block is mounted on gimbal means 50 by which it is attached to a fixed plate provided with the aperture 13 through which the stylus block 27 projects and which limits the amount of movement of the stylus. Attached to the stylus block 27 are two feedback potentiometers of which only the x-axis potentiometer 18 is shown.

The circuit diagram for this arrangement is shown in FIG. 5 from which it will be seen that the x-axis solenoid devices are connected in parallel and energised by a signal derived from the y-axis potentiometer 17. The operation of the y-axis solenoid devices is similar.

The signals from the x and y axes are fed through a stylus spin mode selector 43 where the direction of movement either clockwise or anticlockwise is selected depending on whether the signals are allowed to pass through the selector 43 unaltered or inverted.

The signals from the x and y potentiometers are also fed to the x and y drive systems and there is shown an arrangement for causing the drive to be either continuous or step wise depending on whether a timer circuit 45 is energized. When energized, the timer circuit 45 is used to chop the x and y signals to provide pulses to the drive systems at a rate which can be manually selected.

At the present time, it is preferred to use hydraulic devices for driving the carriage in which case the pulses can be fed to electro-hydraulic valves, preferably DOWTY servo valves series 4552 and 4553, which supply hydraulic piston and cylinder devices with fluid to cause the step-wise movement of the carriage.

The above apparatus has been described in relation to controlling a stitching operation. Other uses are envisaged, inter alia, using the stylus arrangement for sensing the periphery of a template for providing a series of co-ordinates representative of various points along the periphery, which co-ordinates can be stored in a computer.

It is also envisaged that the above stylus arrangement could be used to replace previously proposed optical sensing arrangements.

What is claimed is:

1. Tracer apparatus for tracing the periphery of a template pattern, comprising
   (a) a base (B);
   (b) a template (1) containing a template pattern;
   (c) template mounting means (3) supporting said template for coplanar displacement relative to said base;
   (d) stylus means (12) movably connected with said base for engagement with the periphery (11) of the template pattern, said stylus means normally having a first position relative to said base;
   (e) means for displacing one end of said stylus means along a circular search path concentrically arranged about said first stylus position, said stylus displacing means including
      (1) at least two solenoid devices (23,24) connected between said base and said stylus means, said solenoid devices being angularly arranged relative to said stylus means;
      (2) at least two stylus position sensing means (17,18) for sensing the instantaneous position of said stylus means relative to said first position; and
      (3) circuit means connecting said stylus position sensing means with said solenoid devices, respectively, for controlling the operation of said solenoid devices to apply to said stylus means a force having a component perpendicular to the direction of displacement of said stylus means from said first stylus position; and
   (f) means operable by said sensing means when said stylus is in engagement with a given location on the periphery of the template pattern for displacing said template mounting means in a direction parallel with the line extending between said given pattern location and said normal first stylus position, whereby said template is displaced to cause the stylus to trace the entire periphery of the template pattern.

2. Apparatus as defined in claim 1, wherein said stylus displacing means includes
   (1) a ferromagnetic plate arranged normal to the longitudinal axis of and connected at its center with said stylus means; and
   (2) two pairs of said solenoids (23a, 23b; 24a, 24b) connected with said base adjacent said plate in circular arrangement about the longitudinal axis of said stylus means, the solenoids of each pair being diametrically opposed, said pairs of solenoids being orthogonally arranged, the solenoids of each pair being simultaneously operable to attract and repel said plate, respectively.

3. Apparatus as defined in claim 1, and further including limiting means for confining the movement of said stylus means within the area defined by said circular search path.

4. Apparatus as defined in claim 3, wherein said limiting means comprises a plate (P) connected with said base adjacent and parallel with said template, said plate containing a circular opening (13) through which said stylus projects.

5. Tracer apparatus for tracing the periphery of a template pattern, comprising
   (a) a base;
   (b) a template;
   (c) template mounting means supporting said template for coplanar displacement relative to said base;
   (d) stylus means movably connected with said base for engagement with the periphery of the template pattern;
   (e) means for displacing one end of said stylus means along a circular search path concentrically arranged about a normal first stylus position relative to said base, said stylus displacing means including
      (1) a ferromagnetic member connected with said with said stylus means;
      (2) electromagnetic means connected with said base adjacent said ferromagnetic member;
      (3) stylus position sensing means for sensing the instantaneous position of said stylus means relative to said first position; and
      (4) circuit means connecting said stylus position sensing means with said electromagnetic means for applying to said ferromagnetic member and to said stylus means a force having a component perpendicular to the direction displacement of said stylus means from said first stylus position; and
   (f) means operable when said stylus is in engagement with an instantaneous location on the template pattern periphery for displacing said template mounting means in a direction parallel with the line extending between said instantaneous pattern location and said normal first stylus position, whereby said template is displaced to cause the stylus to trace the entire periphery of the template pattern.

6. Tracer apparatus for tracing the periphery of a template pattern, comprising
   (a) a base;

(b) a template;
(c) template mounting means supporting said template for coplanar displacement relative to said base;
(d) stylus means movably connected with said base for engagement with the periphery of the template pattern;
(e) electromagnetic means for displacing one end of said stylus means along a circular search path cencentrically arranged about a normal first stylus position relative to said base, said electromagnetic means including
  (1) a ferromagnetic plate of cruciform configuration connected at its center with and extending normal to said stylus means;
  (2) a permanent magnet connected with said base beneath the central portion of said plate;
  (3) four electromagnets arranged beneath the arm portions of said cruciform plate, respectively, the electromagnets at opposite ends of each pair of aligned arms being arranged for simultaneous operation to attract and repel said plate, respectively; and
  (4) sensing means responsive to the instantaneous position of said stylus means relative to said first stylus position for energizing said electromagnets to effect displacement of said one stylus end along said circular search path; and
(f) means operable when said stylus is in engagement with an instantaneous location on the template pattern periphery for displacing said template mounting means in a direction parallel with the line extending between said instantaneous pattern location and said normal first stylus position, whereby said template is displaced to cause the stylus to trace the entire periphery of the template pattern.

* * * * *